(12) United States Patent
Nakagawa

(10) Patent No.: US 7,344,321 B2
(45) Date of Patent: Mar. 18, 2008

(54) SHUTTER DEVICE AND IMAGE-CAPTURING APPARATUS

(75) Inventor: Kazuyuki Nakagawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 382 days.

(21) Appl. No.: 11/235,880

(22) Filed: Sep. 27, 2005

(65) Prior Publication Data

US 2006/0067674 A1 Mar. 30, 2006

(30) Foreign Application Priority Data

Sep. 30, 2004 (JP) ............................. 2004-286778

(51) Int. Cl.
*G03B 9/00* (2006.01)
*G03B 9/08* (2006.01)

(52) U.S. Cl. ...................................... 396/443; 396/466

(58) Field of Classification Search ................ 396/443, 396/449, 452, 457, 463, 466, 471, 502
See application file for complete search history.

(56) References Cited

U.S. PATENT DOCUMENTS 6,850,281 B2 2/2005 Takahashi

FOREIGN PATENT DOCUMENTS

| JP | 2001-174868 | 6/2001 |
|----|-------------|--------|
| JP | 2001-215555 | 8/2001 |

*Primary Examiner*—Rodney Fuller
(74) *Attorney, Agent, or Firm*—Canon U.S.A. Inc. I.P. Div.

(57) ABSTRACT

A shutter device includes a first light-blocking unit; a second light-blocking unit; a supporting member; and a charging member. The shutter device has a simple structure that does not require a designated interlocking mechanism between the shutter device and an external unit, and that allows the second light-blocking unit to be maintained in a state where a shutter aperture portion is open without having to hold the second light-blocking unit electrically. The supporting member is protrudable into a movement path of the second light-blocking unit to maintain the second light-blocking unit in a state where the shutter aperture portion is open. The supporting member protrudes into or recedes from the movement path of the second light-blocking unit in response to a movement of the charging member, which is provided for charging the first and second light-blocking units.

8 Claims, 18 Drawing Sheets

SHUTTER DEVICE AND IMAGE-CAPTURING APPARATUS

BACKGROUND OF THE INVENTION

1. Field of the Invention

The present invention relates to a shutter device which includes a first light-blocking unit that is movable between a charged position for closing a shutter aperture portion and a position for opening the shutter aperture portion; and a second light-blocking unit that is movable between a charged position for opening the shutter aperture portion and a position for closing the shutter aperture portion. The present invention also relates to an image-capturing apparatus equipped with a shutter device of this type.

2. Description of the Related Art

In a charged state of a typical shutter device of a direct-supporting type, an electromagnet corresponding to a first curtain included in the first light-blocking unit and an electromagnet corresponding to a second curtain included in the second light-blocking unit are electrified in order to maintain the first and second curtains in the charged state. By sequentially cutting off the electricity applied to the electromagnets, a light-exposure process is performed.

On the other hand, Japanese Patent Laid-Open No. 2001-215555 (corresponding to U.S. Pat. No. 6,850,281) discloses a shutter device in which driving levers for the second curtain and the first curtain are in a charged state when the charging operation of the shutter device is completed. This restores the second curtain to an image-capture preparation state such that the shutter device is set to an opened state. By performing a charge-releasing operation of the shutter device, the first curtain switches to an image-capture preparation state, whereby the shutter device is set to an image-capture preparation state.

According to the typical shutter device of the direct-supporting type described above, in order to maintain the opened-shutter state in which an image is viewable through, for example, a monitor provided on the back surface of a camera, it is necessary to keep electrifying the electromagnet that holds the second curtain. Consequently, this leads to an increase in power consumption.

In contrast, the shutter device disclosed in Japanese Patent Laid-Open No. 2001-215555 mechanically holds the first and second curtains, and drives the first and second curtains by unlocking a supporting mechanism. For this reason, it is not necessary to perform an electrical supporting operation for maintaining the second curtain. However, due to the fact that, for example, a second-curtain driving lever has a two-body structure, the shutter device requires a large number of components, which complicates the structure of the shutter device as well as leading to an expensive mechanism. Accordingly, further improvements can be made in a shutter device that holds the second curtain with a simple structure without needing to perform an electrical supporting operation for holding the second curtain.

SUMMARY OF THE INVENTION

The present invention is directed to a shutter device and an image-capturing apparatus having a simple structure without requiring a designated interlocking mechanism between the shutter device and an external unit, and that allow a second light-blocking unit to be maintained in a state where a shutter aperture portion is open without having to hold the second light-blocking unit electrically.

Specifically, according to a first aspect of the present invention, a shutter device is provided. The shutter device includes a first light-blocking unit that is movable between a charged position for closing a shutter aperture portion and a position for opening the shutter aperture portion; a second light-blocking unit that is movable between a charged position for opening the shutter aperture portion and a position for closing the shutter aperture portion; a charging member which charges the first and second light-blocking units and is movable at least between a first position, in which the charging member maintains a charged state of the first light-blocking unit and a charged state of the second light-blocking unit, and a second position in which the first and second light-blocking units are movable; electromagnetic circuits to which the first and second light-blocking units are attachable so as to electrically support the first light-blocking unit in the charged state and the second light-blocking unit in the charged state, the electromagnetic circuits sequentially releasing the attached first and second light-blocking units so as to sequentially allow the first and second light-blocking units to move such that a light-exposure process is performed; and a supporting member which protrudes into or recedes from a movement path of the second light-blocking unit in response to a movement of the charging member, the supporting member protruding into the movement path of the second light-blocking unit to maintain the second light-blocking unit in a state where the shutter aperture portion is open.

According to a second aspect of the present invention, an image-capturing apparatus is provided. The image-capturing apparatus includes a first light-blocking unit that is movable between a charged position for closing a shutter aperture portion and a position for opening the shutter aperture portion; a second light-blocking unit that is movable between a charged position for opening the shutter aperture portion and a position for closing the shutter aperture portion; a charging member which charges the first and second light-blocking units and is movable at least between a first position, in which the charging member maintains a charged state of the first light-blocking unit and a charged state of the second light-blocking unit, and a second position in which the first and second light-blocking units are movable; electromagnetic circuits to which the first and second light-blocking units are attachable so as to electrically support the first light-blocking unit in the charged state and the second light-blocking unit in the charged state, the electromagnetic circuits sequentially releasing the attached first and second light-blocking units to sequentially allow the first and second light-blocking units to move such that a light-exposure process is performed; and a supporting member which protrudes into or recedes from a movement path of the second light-blocking unit in response to a movement of the charging member, the supporting member protruding into the movement path of the second light-blocking unit to maintain the second light-blocking unit in a state where the shutter aperture portion is open.

Further features of the present invention will become apparent from the following description of exemplary embodiments.

DESCRIPTION OF THE EMBODIMENTS

The following description of at least one exemplary embodiment is merely illustrative in nature and is in no way intended to limit the invention, its application, or uses.

Processes, techniques, apparatus, and materials as known by one of ordinary skill in the relevant art may not be discussed in detail but are intended to be part of the enabling description where appropriate.

Exemplary embodiments will be described in detail below with reference to the drawings.

First Embodiment

An image-capturing apparatus including a shutter device according to a first embodiment of the present invention will now be described with reference to FIGS. 1 to 4.

Figure 1:
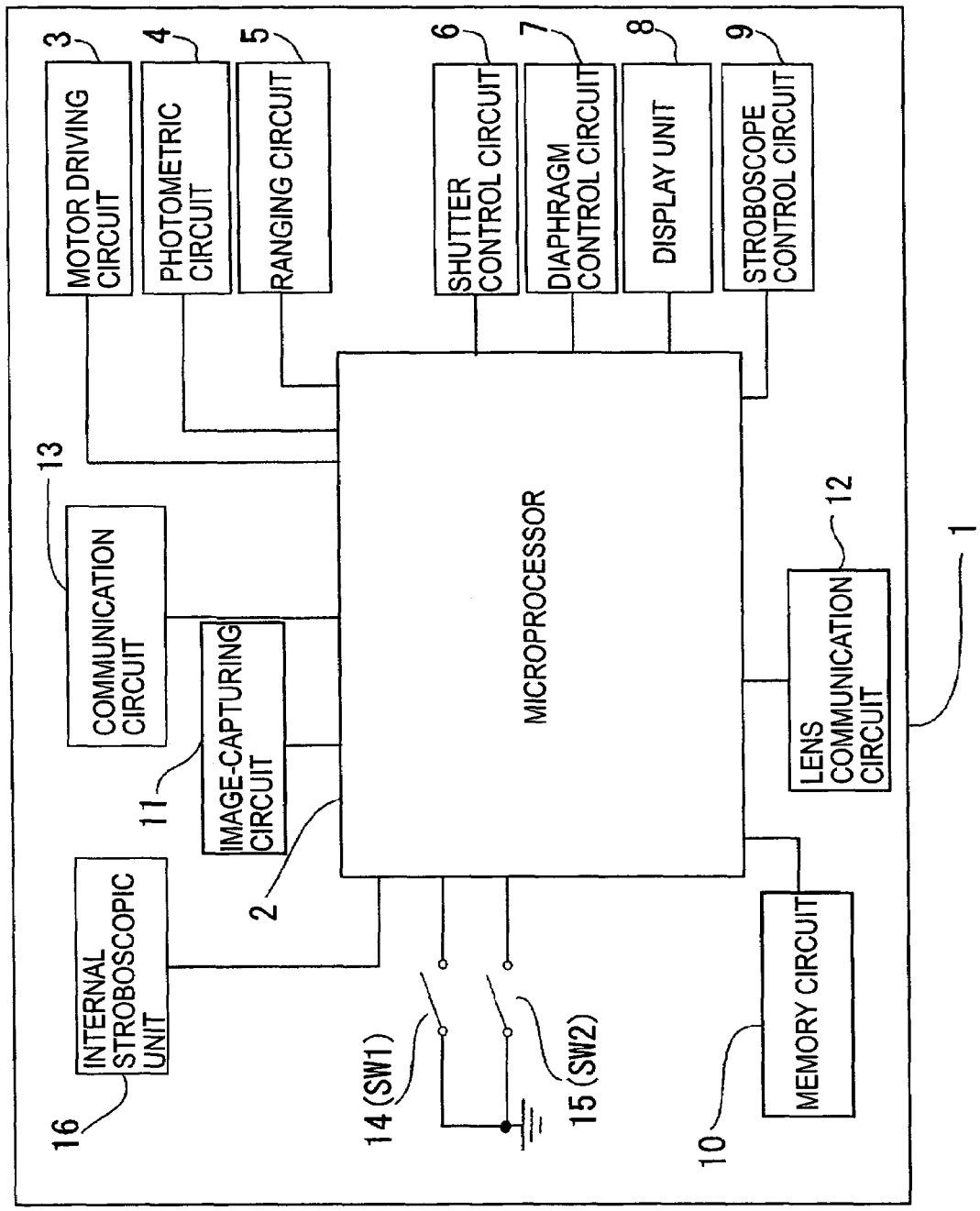
FIG. 1 is a block diagram illustrating an electrical configuration of an image-capturing apparatus according to first and second embodiments of the present invention.

Referring to a block diagram of FIG. 1, the electrical configuration of an image-capturing apparatus 1 will be described below. In FIG. 1, the image-capturing apparatus 1 includes a microprocessor 2 which controls various elements included in the image-capturing apparatus 1; a motor driving circuit 3 for driving movable elements included in the image-capturing apparatus 1; a photometric circuit 4 for measuring the luminance of a subject; a ranging circuit 5 for measuring the distance from the subject; a shutter control circuit 6 for controlling the light exposure of the image-capturing apparatus 1; a diaphragm control circuit 7 for controlling a light beam entering the image-capturing apparatus 1; a display unit 8 for displaying the conditions of the image-capturing apparatus 1; a stroboscope control circuit 9 for controlling an internal stroboscopic unit 16 built in the image-capturing apparatus 1; a memory circuit 10 for storing setting conditions of the image-capturing apparatus 1; an image-capturing circuit 11 for performing an image-capturing process; a lens communication circuit 12 which communicates with a lens mounted to the image-capturing apparatus 1; a communication circuit 13 which communicates with accessories other than the lens; a switch 14 (SW1) for starting an image-capture preparation process in the image-capturing apparatus 1; a switch 15 (SW2) for starting the image-capturing process in the image-capturing apparatus 1; and the internal stroboscopic unit 16 which illuminates the subject during the image-capturing process when an external stroboscopic unit is not mounted to the image-capturing apparatus 1, and which is also used as a fill light that illuminates the subject during a ranging process.

Figure 2:
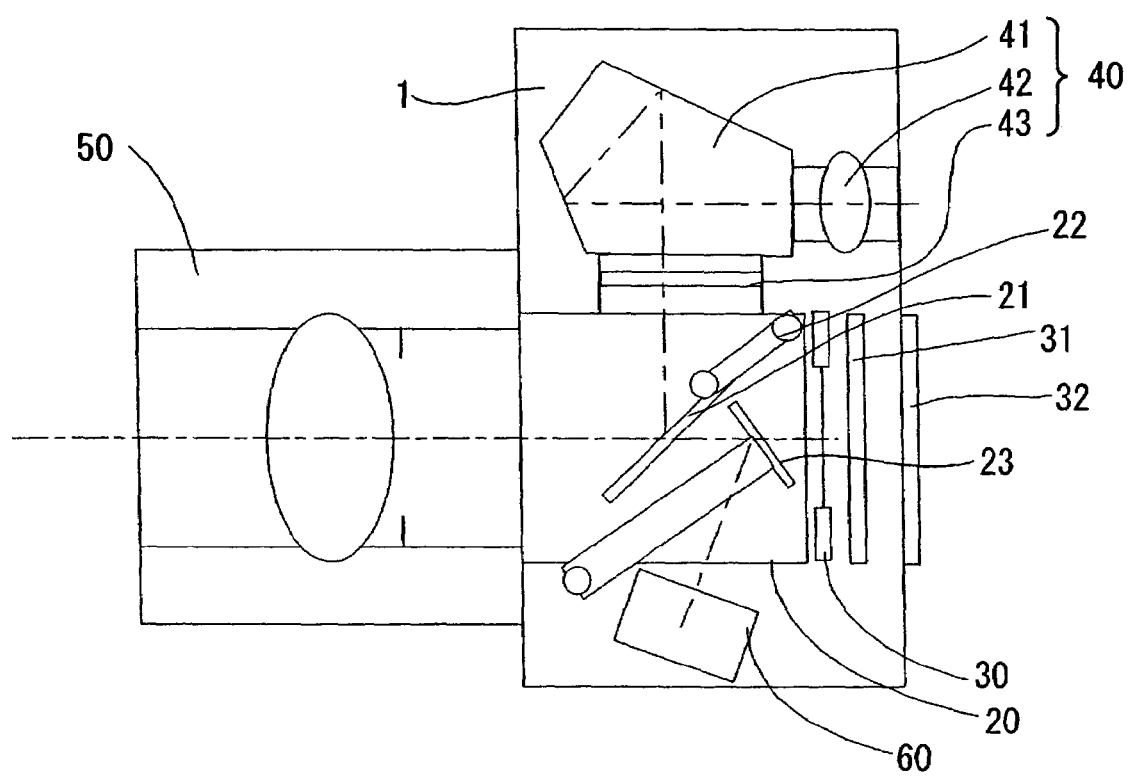
FIG. 2 illustrates a state in which a shutter device of the image-capturing apparatus shown in FIG. 1 is closed such that an image is viewable through an optical viewfinder.
Figure 3:
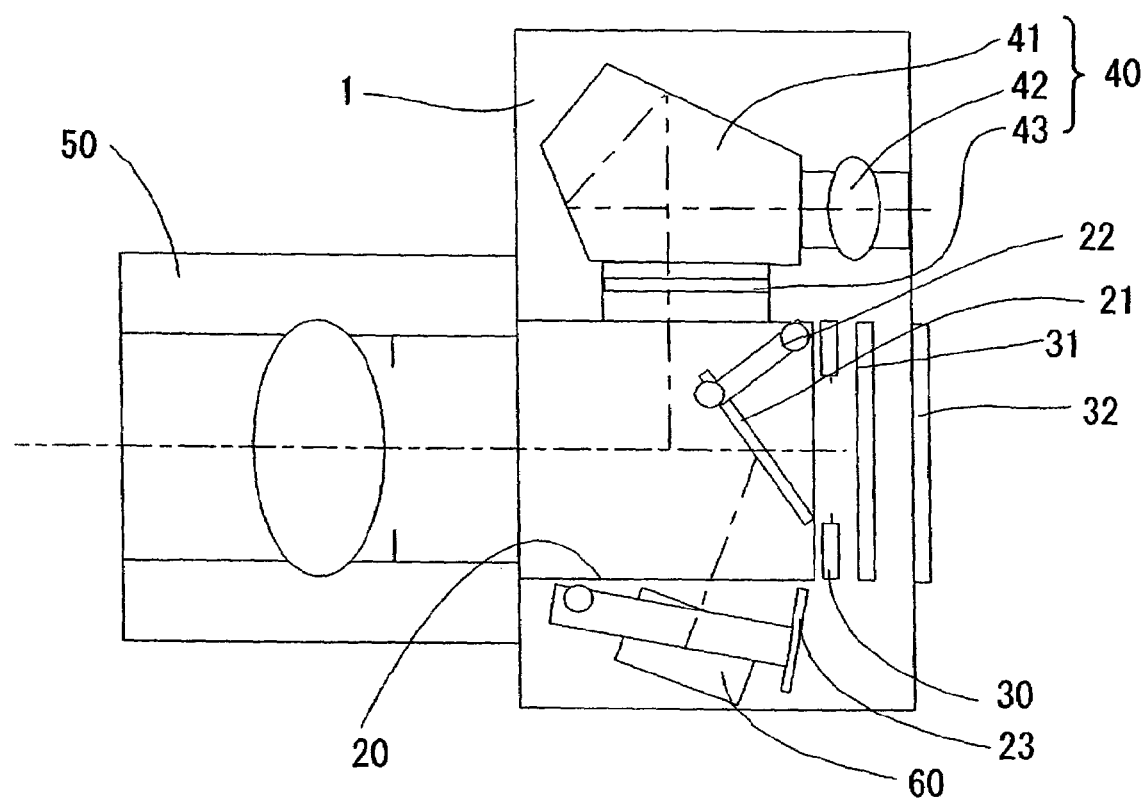
FIG. 3 illustrates a state in which the shutter device of the image-capturing apparatus shown in FIG. 1 is open such that an image from an image-capturing unit is viewable.
Figure 4:
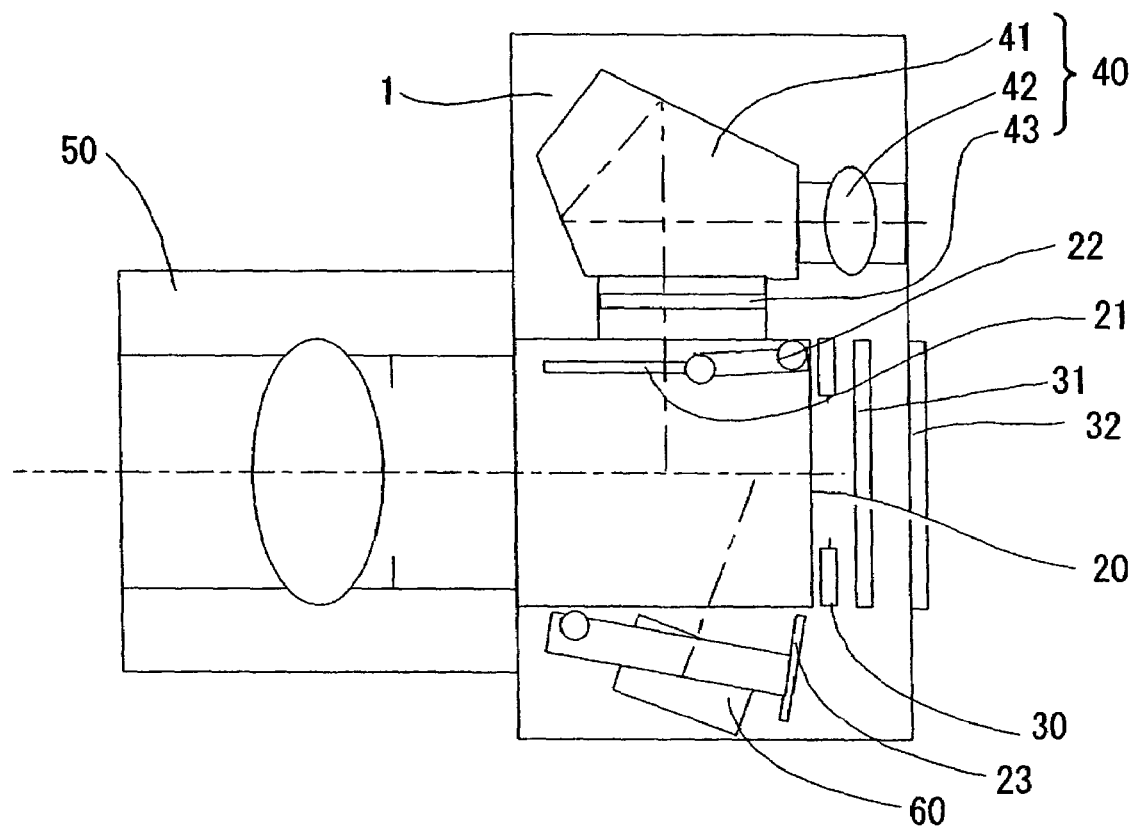
FIG. 4 illustrates an image-capturing state in which the shutter device of the image-capturing apparatus shown in FIG. 1 is driven.

FIGS. 2 to 4 schematically illustrate optical elements of the image-capturing apparatus 1. Specifically, FIG. 2 illustrates a state in which a shutter is closed such that an optical image can be viewed through an optical viewfinder. FIG. 3 illustrates a state in which the shutter is open such that an image from an image-capturing unit can be viewed through a monitor provided on a back surface of the image-capturing apparatus 1. FIG. 4 illustrates an image-capturing state in which the shutter is driven.

Referring to FIGS. 2 to 4, reference numeral 20 indicates a mirror box. Reference numeral 21 indicates a main mirror, which is rotatably supported by the mirror box 20 via a mirror lever 22. Reference numeral 23 indicates a sub mirror, which is rotatably supported by the mirror box 20. Reference numeral 30 indicates a shutter device for adjusting a light beam entering an image-capturing unit 31 that captures an image. Reference numeral 32 indicates an external display portion attached to an exterior of the image-capturing apparatus 1 such that the display portion can be viewed from the outside. Reference numeral 40 indicates an optical viewfinder system which includes an optical viewfinder and receives a light beam reflected by the main mirror 21. The optical viewfinder system 40 includes an erect-image optical unit 41 which converts the image in the optical viewfinder into an erect image; an optical ocular unit 42; and a reticle 43. Reference numeral 60 indicates a focus detector. Specifically, in the state shown in FIG. 2, the focus detector 60 detects a light beam transmitted through the main mirror 21 and reflected by the sub mirror 23, whereas in the state shown in FIG. 3, the focus detector 60 detects a light beam reflected by the main mirror 21 so as to detect the light beam in a focused state. Reference numeral 50 indicates an image-capturing lens which introduces an image of the subject into the image-capturing apparatus 1 and focuses the image.

Figure 5:
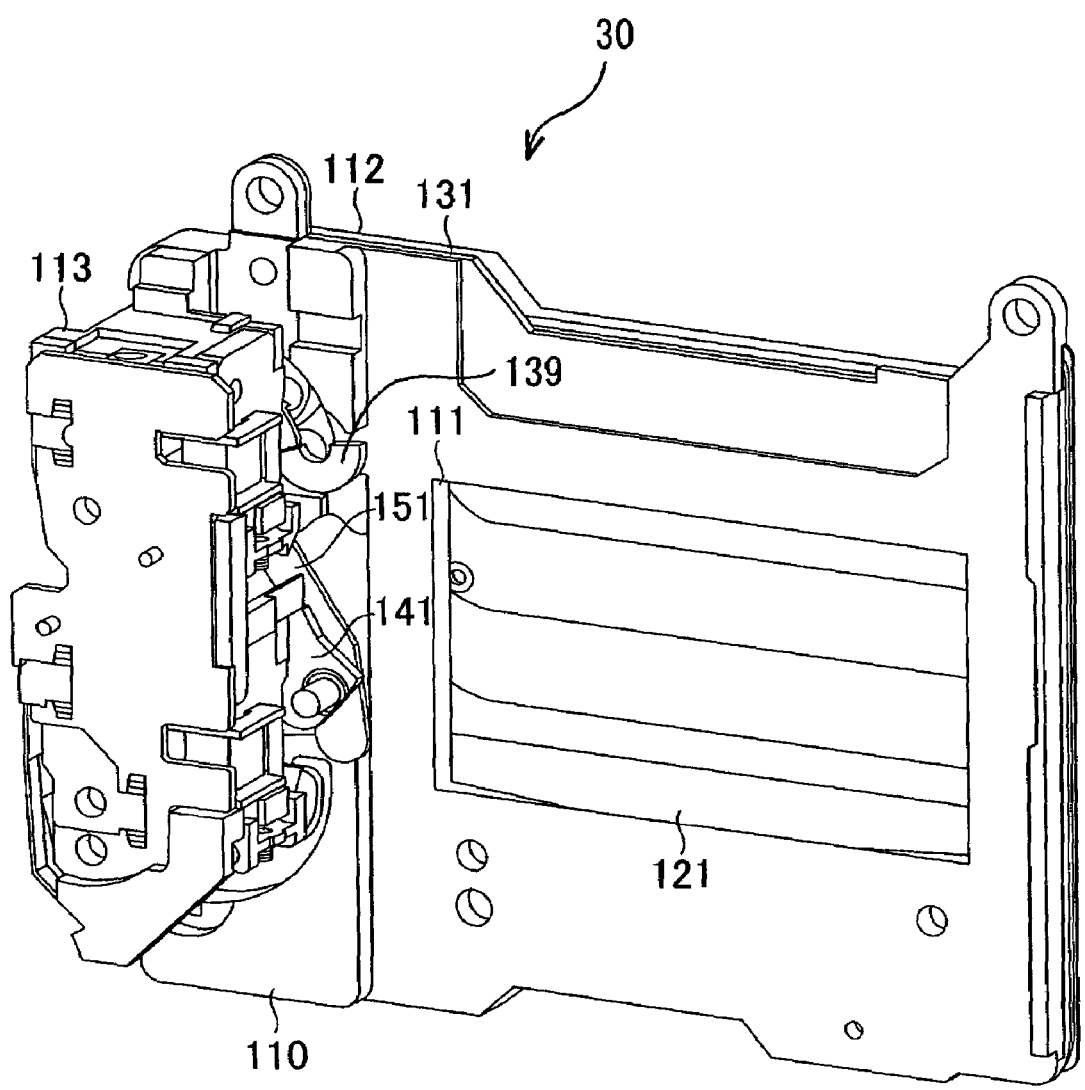
FIG. 5 illustrates the overall structure of the shutter device according to the first embodiment of the present invention.
Figure 6:
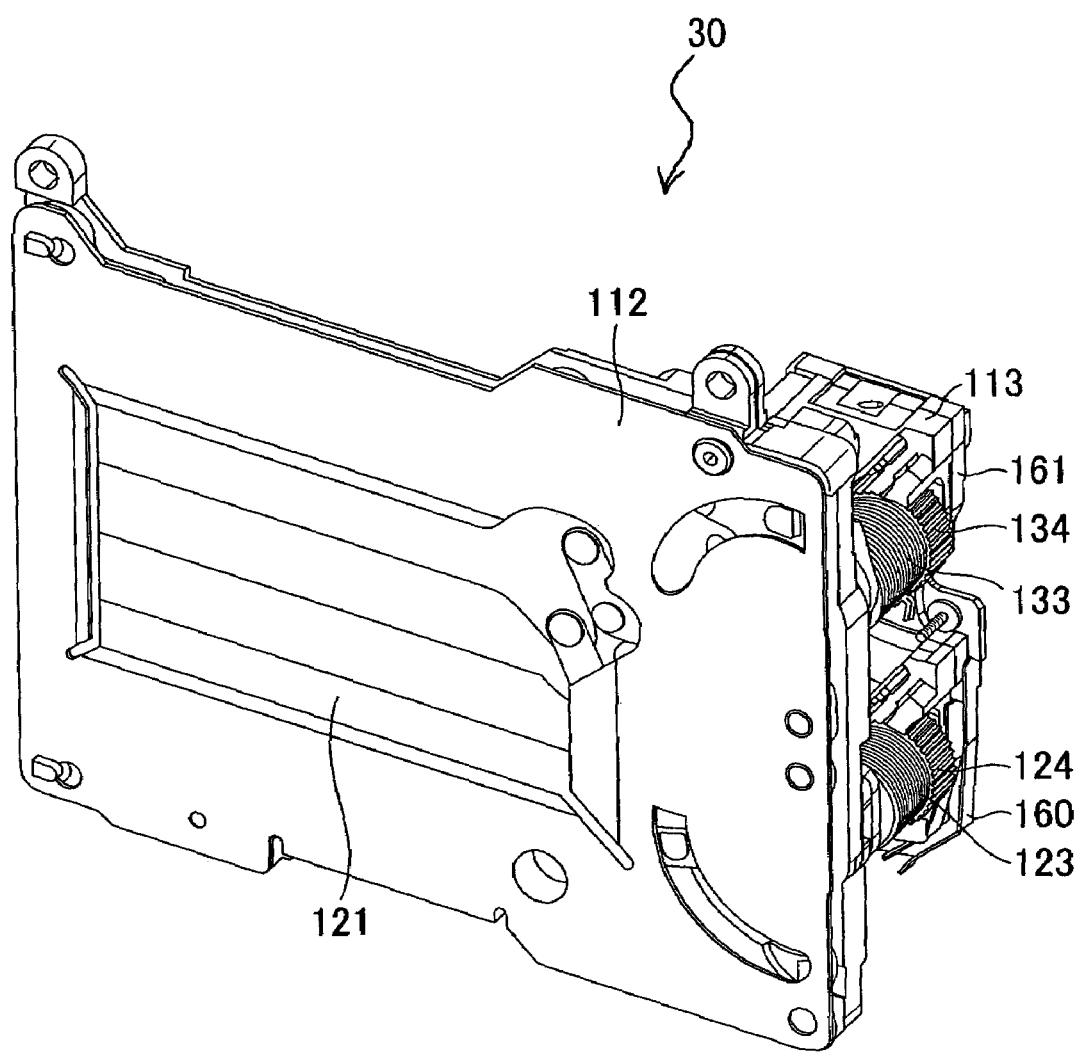
FIG. 6 illustrates the overall structure of the shutter device according to the first embodiment of the present invention.

Referring to FIGS. 5 to 11, the shutter device 30 included in the image-capturing apparatus 1 according to the first embodiment of the present invention will be described below. FIGS. 5 and 6 illustrate an overall structure of the shutter device 30 included in the image-capturing apparatus 1. FIGS. 7 to 11 each illustrate one of states in a shutter-charging operation of the shutter device 30.

First, the structure of the shutter device 30 according to the first embodiment of the present invention will be described with reference to FIGS. 5, 6, and 7. In these drawings, reference numeral 110 indicates a shutter base plate for supporting various components included in the shutter device 30. Reference numeral 111 indicates a divider plate for dividing operating spaces for first and second curtains (which will be described below in detail) with respect to an optical-axis direction. Reference numeral 112 indicates a cover plate which is fixed to the shutter base plate 110 and defines the operating spaces for the first and second curtains together with the divider plate 111. Reference numeral 113 indicates an MG base plate for supporting a control mechanism of the shutter device 30. Reference numeral 121 indicates the first curtain included in a first light-blocking unit for blocking light from entering the image-capturing unit 31 shown in, for example, FIG. 3 before the image-capturing process (i.e. in the image-capture preparation state). Reference numeral 131 indicates the second curtain included in a second light-blocking unit for blocking light from entering the image-capturing unit 31 after the image-capturing process. Reference numeral 122 indicates a first driving lever which is rotatably supported by the shutter base plate 110 and is engaged to the first curtain 121 to drive the first curtain 121. Reference numeral 132 indicates a second driving lever which is rotatably supported by the shutter base plate 110 and is engaged to the second curtain 131 to drive the second curtain 131. Reference numeral 123 indicates a first driving spring that applies a driving force to the first driving lever 122. Reference numeral 133 indicates a second driving spring that applies a driving force to the second driving lever 132.

Reference numeral 124 indicates a first-driving-spring charging member which adjusts the charging amount of the first driving spring 123 in order to control the driving rate of the first curtain 121. Reference numeral 134 indicates a second-driving-spring charging member which adjusts the charging amount of the second driving spring 133 in order to control the driving rate of the second curtain 131. Reference numerals 125 and 135 indicate yokes. Specifically, the yoke 125 is for supporting the first curtain 121, and the yoke 135 is for supporting the second curtain 131. Reference numerals 126 and 136 indicate coils. The coil 126 and the yoke 125 together form an electromagnetic circuit, and the coil 136 and the yoke 135 together form an electromagnetic circuit. Reference numerals 127 and 137 indicate armatures which are attachable to the yoke 125 and the yoke 135, respectively, so as to support the first curtain 121 and the second curtain 131. Specifically, the armature 127 supports the first curtain 121, and the armature 137 supports the second curtain 131.

In the first embodiment, the first curtain 121, the first driving lever 122, and the armature 127 define the first light-blocking unit. Likewise, the second curtain 131, the second driving lever 132, and the armature 137 define the second light-blocking unit.

Reference numerals 128 and 138 indicate charging rollers for transmitting an input from a charging lever, which will be described below in detail. The charging roller 128 is rotatably supported by the first driving lever 122. Likewise, the charging roller 138 is rotatably supported by the second driving lever 132. Reference numerals 129, 139 indicate driving-lever stoppers, which are mounted to the shutter base plate 110 and are provided for absorbing the impact of the first driving lever 122 and the second driving lever 132, respectively, at the end of each driving process. Specifically, the driving-lever stopper 129 absorbs the impact of the first driving lever 122, whereas the driving-lever stopper 139 absorbs the impact of the second driving lever 132. Reference numeral 141 indicates the charging lever that performs a charging operation on the first driving lever 122 and the second driving lever 132 in response to an input from an external unit of the shutter device 30. Reference numeral 142 indicates a supporting-driving-lever driving portion, which is engageable to a supporting-driving lever 152.

Reference numeral 151 indicates a supporting lever, which is rotatably supported by the shutter base plate 110 and is capable of protruding towards and receding from a movement path of the second driving lever 132. The supporting-driving lever 152 mentioned above is rotatably supported by the supporting lever 151. Reference numeral 153 indicates a supporting-lever spring that applies a driving force to the supporting lever 151 to allow the supporting lever 151 to protrude towards the movement path of the second driving lever 132. Reference numeral 154 indicates a supporting-lever absorption spring provided between the supporting lever 151 and the supporting-driving lever 152. Reference numeral 160 indicates an X contact segment, which outputs a tuning signal of a stroboscope unit as well as detecting completion of a driving operation of the first curtain 121. Reference numeral 161 indicates a second-curtain detecting contact-segment, which detects completion of a driving operation of the second curtain 131.

Figure 7:
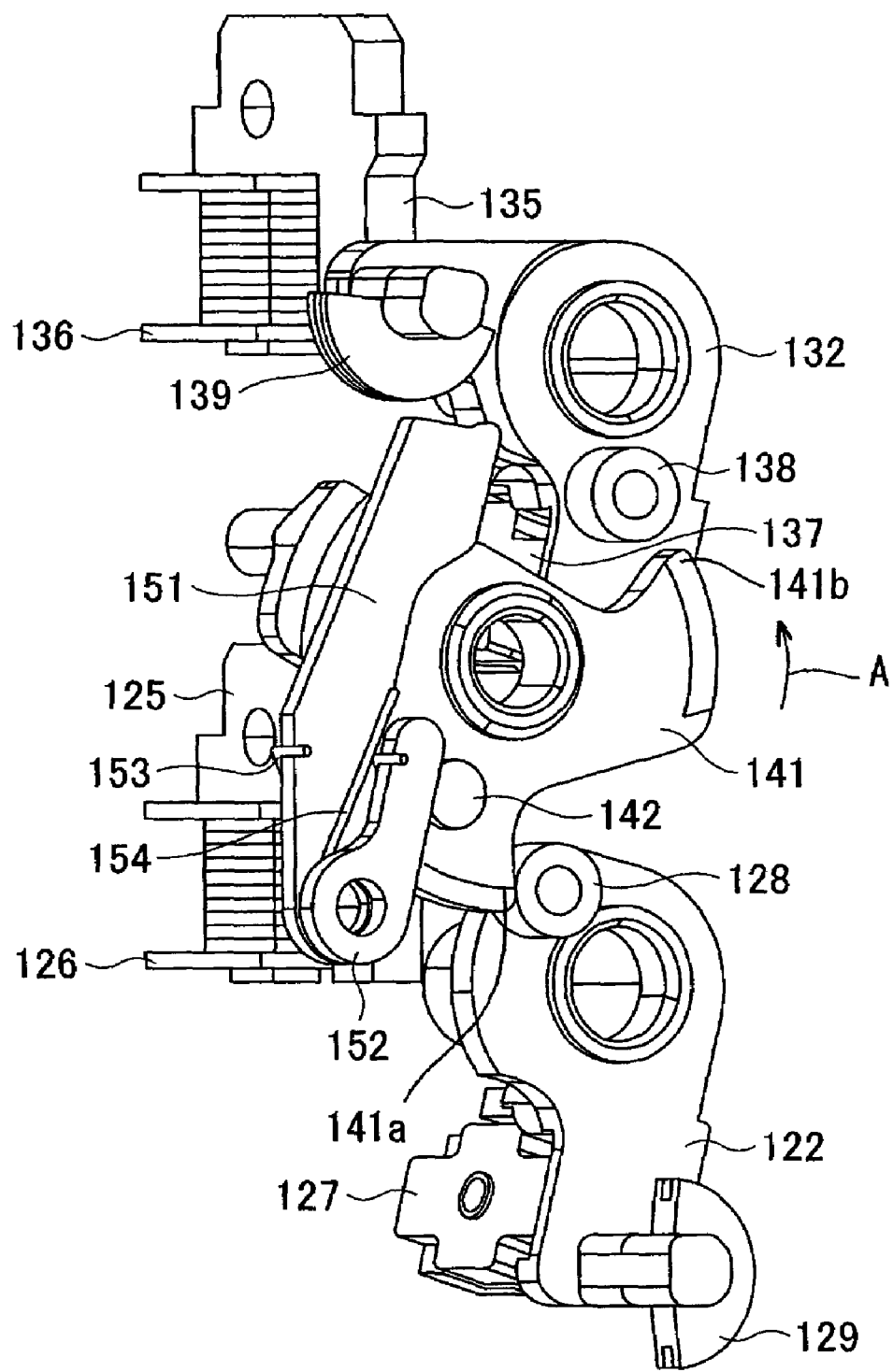
FIG. 7 illustrates a state in which a light-exposure process is completed according to the first embodiment of the present invention.
Figure 8:
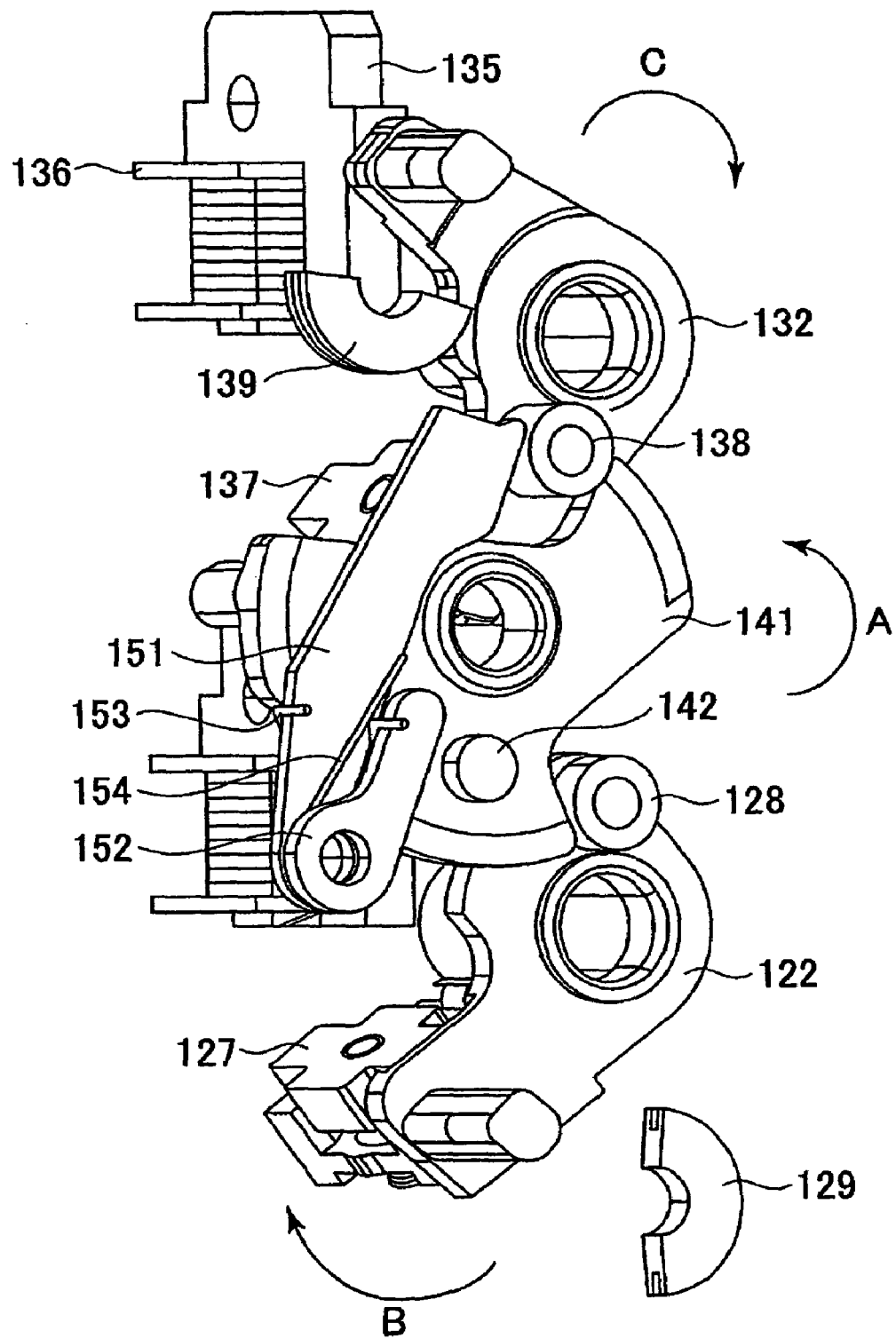
FIG. 8 illustrates a state in the process of a charging operation according to the first embodiment of the present invention.
Figure 9:
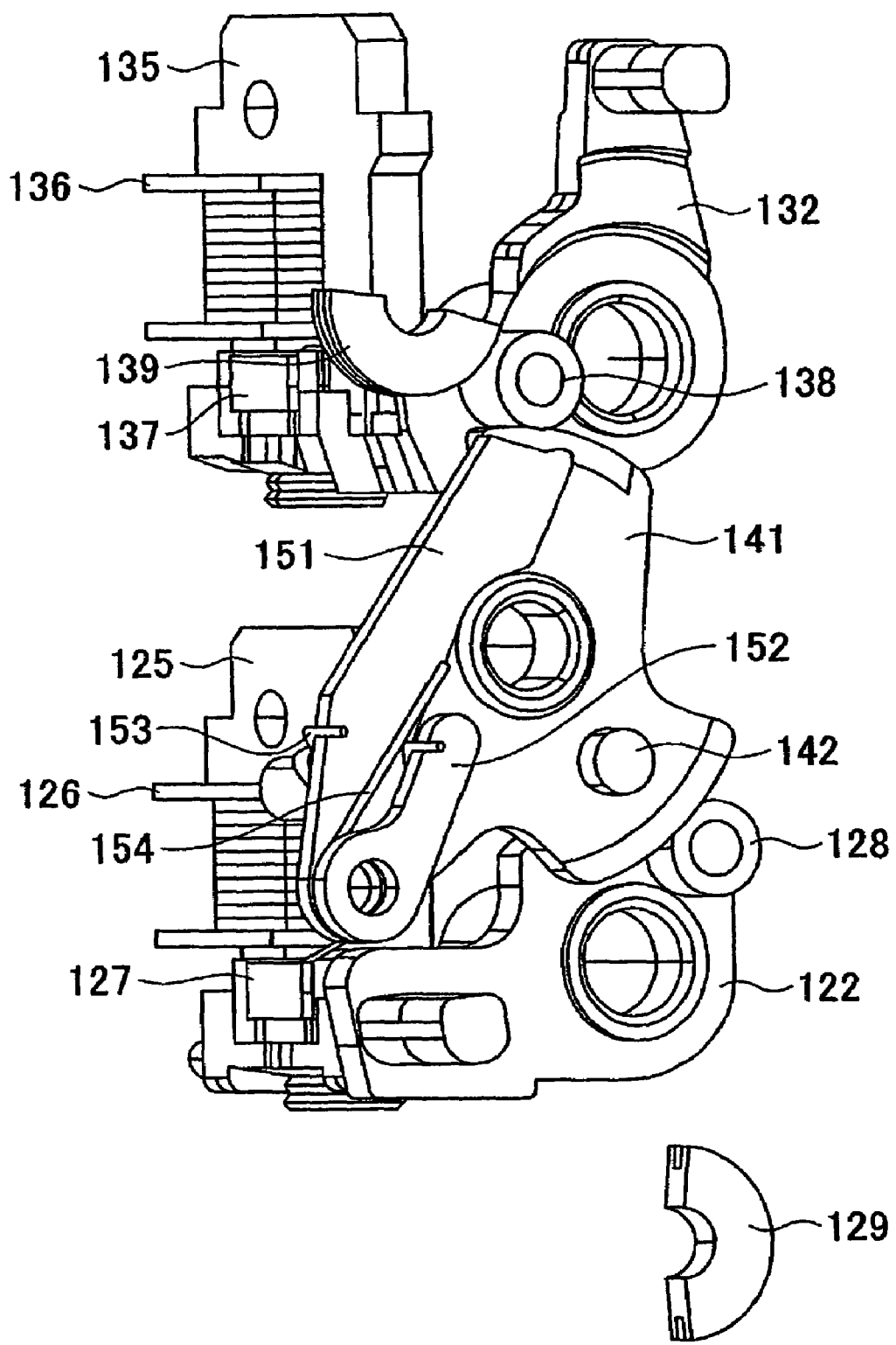
FIG. 9 illustrates a state in which the charging operation is completed according to the first embodiment of the present invention.

Referring to FIGS. 7 to 9, the shutter-charging operation will be described below. FIG. 7 illustrates a state in which a light exposure process is completed. FIG. 8 illustrates a state in the process of a charging operation. FIG. 9 illustrates a state in which the charging operation is completed.

In FIG. 7, when the charging lever 141 receives a charging force from an external unit, the charging lever 141 begins to rotate counterclockwise (in a direction indicated by an arrow A) with respect to a rotational axis of the shutter base plate 110. As the charging lever 141 rotates, a first portion 141a of the charging lever 141 abuts on the charging roller 128 mounted to the first driving lever 122. This allows the first driving lever 122 to start rotating in a direction indicated by an arrow B shown in FIG. 8, whereby the charging operation of the first curtain 121 begins. As the charging lever 141 rotates further in the counterclockwise direction, a second portion 141b of the charging lever 141 abuts on the charging roller 138 mounted to the second driving lever 132. Thus, the second driving lever 132 starts rotating in a direction indicated by an arrow C in FIG. 8, whereby the charging operation of the second curtain 131 begins. In response to this further rotation of the charging lever 141, the supporting-driving-lever driving portion 142 recedes from the supporting-driving lever 152. Consequently, this cancels out the force preliminarily applied to the supporting-driving lever 152 that allows the supporting lever 151 to recede from the movement path of the second driving lever 132, whereby the supporting lever 151 protrudes into the movement path of the second driving lever 132 in response to a biasing force of the supporting-lever spring 153. As a result, the supporting lever 151 abuts on the charging roller 138, as shown in FIG. 8.

As the charging lever 141 rotates further in the counterclockwise direction (i.e., the direction of the arrow A) from the state shown in FIG. 8, the charging operations of the first driving lever 122 and the second driving lever 132 proceed. When the second driving lever 132 reaches an overcharged range, the supporting lever 151 stops blocking the charging roller 138. Thus, the supporting lever 151 protrudes into the movement path of the second driving lever 132 in response to the biasing force of the supporting-lever spring 153 so as to reach the state shown in FIG. 9. As a result, the charging operations for the first curtain 121 and the second curtain 131 are completed.

Figure 10:
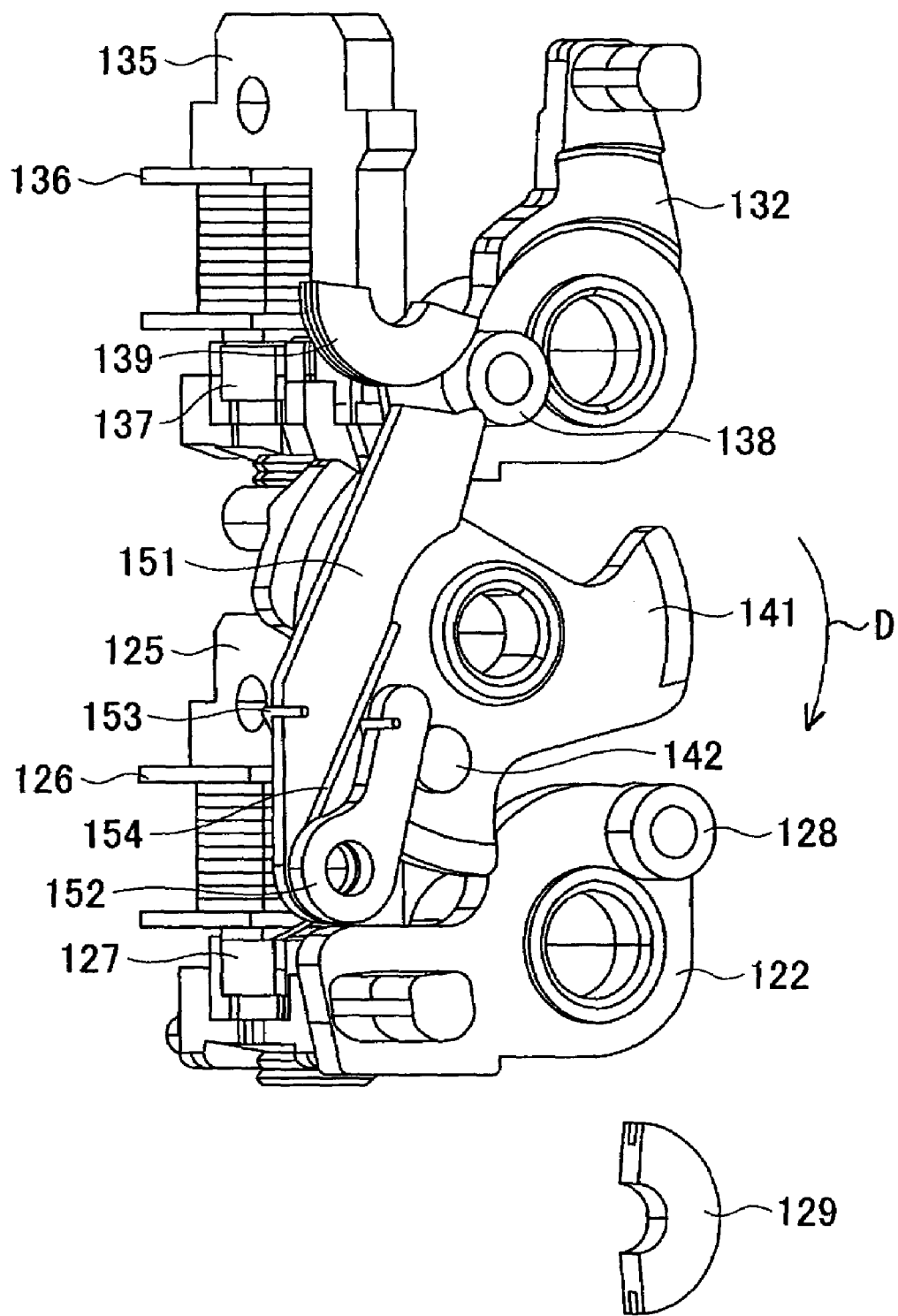
FIG. 10 illustrates a light-exposure preparation state according to the first embodiment of the present invention.

Referring to FIGS. 9 and 10, the process from the charged state to the image-capturing operation will be described below.

In the state shown in FIG. 9 in which the charging operations for the first curtain 121 and the second curtain 131 are completed, the coil 126 and the coil 136 are electrified in order to maintain the first curtain 121 and the second curtain 131. Subsequently, a releasing operation of the charging force input to the charging lever 141 from the external unit is started. In this case, even if the charge-releasing operation of the charging lever 141 is started, the armature 127 and the armature 137 are still attached to the yoke 125 and the yoke 135, respectively, due to the electricity applied to the coil 126 and the coil 136. Accordingly, the first driving lever 122 and the second driving lever 132 are maintained in the state shown in FIG. 9. When the charging force of the charging lever 141 is released, the charging lever 141 rotates clockwise (in a direction indicated by an arrow D in FIG. 10) so as to reach a light-exposure preparation state shown in FIG. 10 in which the supporting-driving-lever driving portion 142 drives the supporting-driving lever 152. In this state shown in FIG. 10, since the second driving lever 132 is maintained in an overcharged state, the second driving lever 132 and the supporting lever 151 do not engage with each other. This means that the supporting lever 151 recedes from the movement path of the second driving lever 132. By changing the electrified state of the coil 126 and the coil 136 to a non-electrified state, the first curtain 121 and the second curtain 131 are driven, whereby the image-capturing process is performed.

Figure 11:
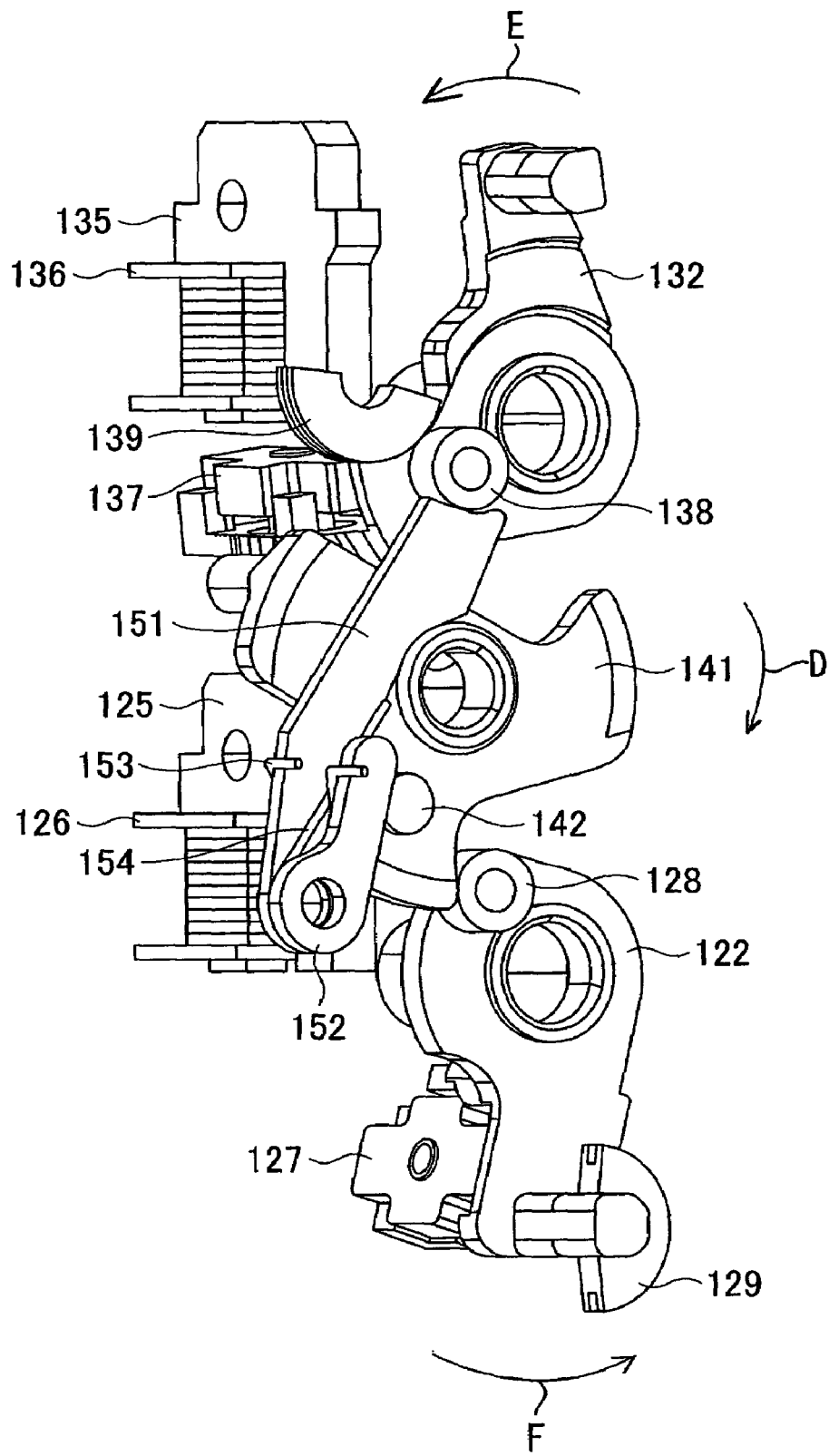
FIG. 11 illustrates a state in which the shutter device is open in the first embodiment of the present invention.

Referring to FIGS. 9 and 11, the process from the charged state to the opened-shutter state shown in FIG. 3 will be described below. Specifically, the opened-shutter state is a state in which an image can be viewed through the monitor provided on, for example, the back surface of the image-capturing apparatus 1. Such an image-viewable state can be achieved by setting the mode of the image-capturing apparatus 1 to a monitor display mode.

A switching process between the light-exposure preparation state shown in FIG. 10 and the image-viewable state shown in FIG. 11 is based on whether the coils 126, 136 are electrified or not electrified after performing the shutter-charging operation (the state shown in FIG. 9) using the charging lever 141. Accordingly, in order to switch between the light-exposure preparation state (FIG. 10) and the image-viewable state (FIG. 11), the shutter-charging operation using the charging lever 141 (i.e. rotating the charging lever 141 counterclockwise) is first performed again in one of the two states shown in FIGS. 10 and 11 so as to reach the state shown in FIG. 9 again. Subsequently, the switching process to one of the two states is achieved by electrifying or not electrifying the coils 126, 136. In detail, when switching to the light-exposure preparation state (FIG. 10) from the image-viewable state (FIG. 11), the shutter-charging operation is performed again in the state shown in FIG. 11. In this case, the charging lever 141 presses against the charging roller 138 so that the supporting lever 151 and the charging roller 138 become disengaged, whereby the armature 137 abuts on the yoke 135, as shown in FIG. 9. At the same time, the charging lever 141 presses against the charging roller 128 so that the armature 127 abuts on the yoke 125. By electrifying the coils 126, 136 in this state where the armature 127 abuts on the yoke 125 and the armature 137 abuts on the yoke 135, the light-exposure preparation state shown in FIG. 10 can be achieved. On the other hand, in order to switch from the light-exposure preparation state (FIG. 10) to the image-viewable state (FIG. 11), the charging lever 141 is first driven so as to reach the state shown in FIG. 9. The electricity for the coils 126, 136 is then cut off. Subsequently, the charge-releasing operation of the charging lever 141 is performed, thereby reaching the state shown in FIG. 11.

FIG. 9 illustrates the state of the shutter device 30 in which the charging operation is completed, and in order to switch to the state shown in FIG. 11 from this state, the charge-releasing operation of the charging lever 141 is started. In this case, unlike the switching process to the image-capturing operation, the coil 126 and the coil 136 are not electrified. Accordingly, when the charging lever 141 starts rotating in the direction of the arrow D in order to start the charge-releasing operation, the second driving lever 132 starts to rotate in the direction of the arrow E and the first driving lever 122 starts to rotate in the direction of the arrow F. In this case, the second driving lever 132 abuts on the supporting lever 151 shortly after the start of the rotation so as to become held by the supporting lever 151 as shown in FIG. 11. The second driving lever 132 is thus prevented from rotating any further in the direction of the arrow E. On the other hand, the first driving lever 122 rotates until reaching its final rotational position. Furthermore, since the charging lever 141 rotating clockwise (i.e. in the direction of the arrow D) allows the supporting-driving-lever driving portion 142 to abut on the supporting-driving lever 152, the supporting lever 151 becomes biased in the receding direction. However, the supporting lever 151 does not change its position since the supporting lever 151 is engaged to the charging roller 138 mounted to the second driving lever 132. Accordingly, the biasing force is absorbed by the supporting-lever absorption spring 154. As a result, the shutter device 30 is maintained in a state where a shutter aperture portion (not shown) is open.

In the first embodiment, when the second light-blocking unit is attached to and supported by the yoke 135, the supporting lever 151 acts in the following manner. When the charging lever 141 moves from a first position in FIG. 9 to a second position shown in FIG. 10, the supporting lever 151 is forced to recede from the movement path of the second light-blocking unit. Consequently, this allows the second light-blocking unit to become movable when the attachment state of the second light-blocking unit is released. On the other hand, when the second light-blocking unit is not attached to the yoke 135, the following operation is performed. Even when the charging lever 141 moves from the first position shown in FIG. 9 to a second position shown in FIG. 11, the supporting lever 151 remains in a protruded state in the movement path of the second light-blocking unit. Consequently, when the charging lever 141 moves from the first position shown in FIG. 9 to the second position shown in FIG. 11 so as to release the charged state of the second light-blocking unit, the second light-blocking unit is maintained in a state where the shutter aperture portion is open.

In detail, the supporting lever 151 is constantly biased by the supporting-lever spring 153 in the direction in which the supporting lever 151 protrudes into the movement path of the second light-blocking unit. When the second light-blocking unit is attached to and supported by the yoke 135, the charging lever 141 positionally changes from the state in FIG. 9 to the state in which the first and second light-blocking units are movable to positions corresponding to the completion of the image-capturing operation. Subsequently, the supporting-driving-lever driving portion 142 provided on the charging lever 141 abuts on the supporting-driving lever 152, whereby the supporting lever 151 is forced to recede from the movement path of the second light-blocking unit due to the charging lever 141.

Accordingly, this achieves a shutter device 30 having a simplified structure without requiring a designated interlocking mechanism between the shutter device 30 and an external unit, and moreover, provides a shutter device 30 that can maintain the second light-blocking unit in a state where the shutter aperture portion is open without having to hold the second light-blocking unit electrically.

Furthermore, by providing the image-capturing apparatus 1 with the shutter device 30 described above, the switching process between a light-exposure state in which the image-capturing unit 31 performs a light-exposure operation and an image-capturing state in which a continuous image from the image-capturing unit 31 is captured (for example, a state in which the captured image can be viewed through the monitor provided on the back surface of the image-capturing apparatus 1) can be performed with a simple structure. In this case, a designated interlocking mechanism between the shutter device 30 and an external unit is not necessary, and moreover, the second light-blocking unit is maintained in a state where the shutter aperture portion is open without having to hold the second light-blocking unit electrically.

Second Embodiment

Figure 12:
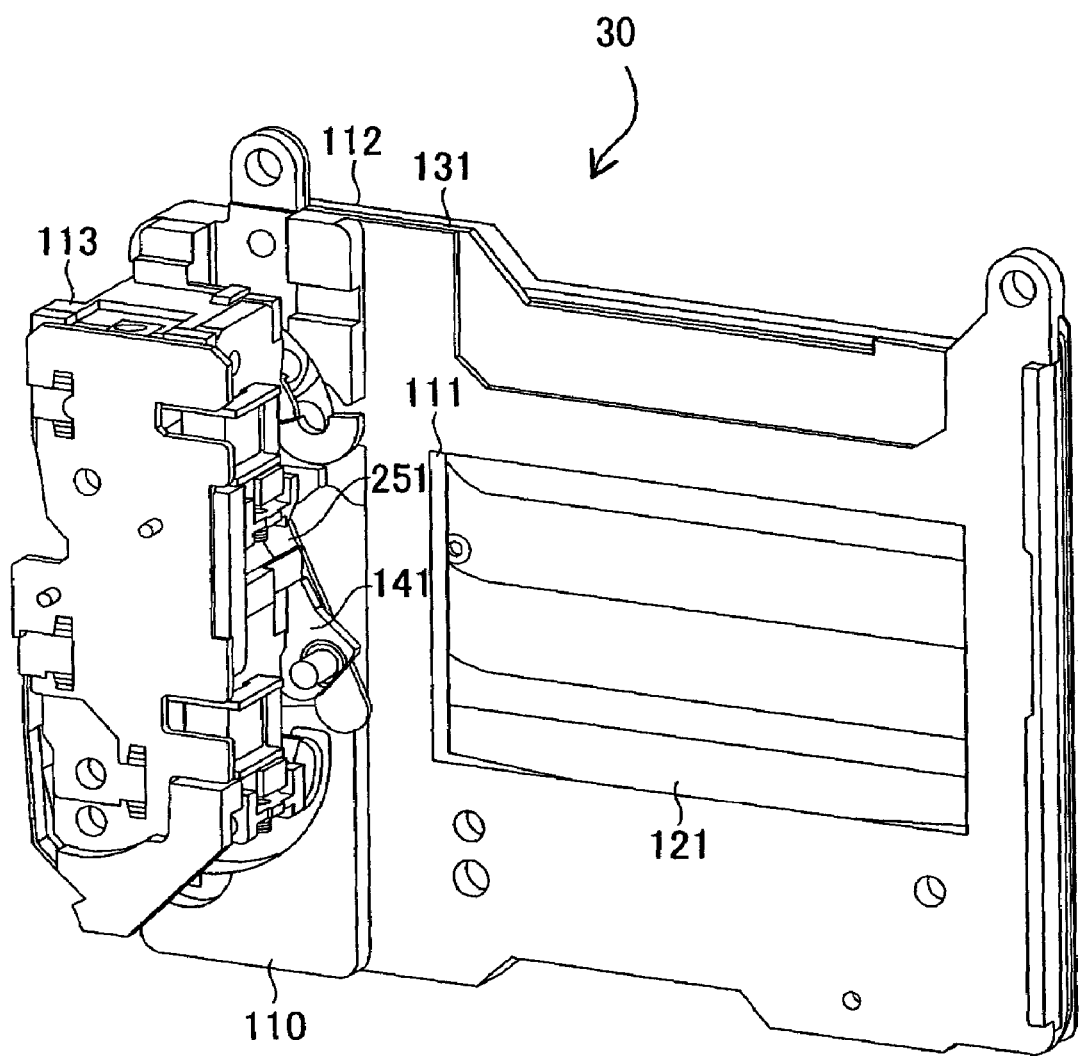
FIG. 12 illustrates the overall structure of the shutter device according to the second embodiment of the present invention.
Figure 13:
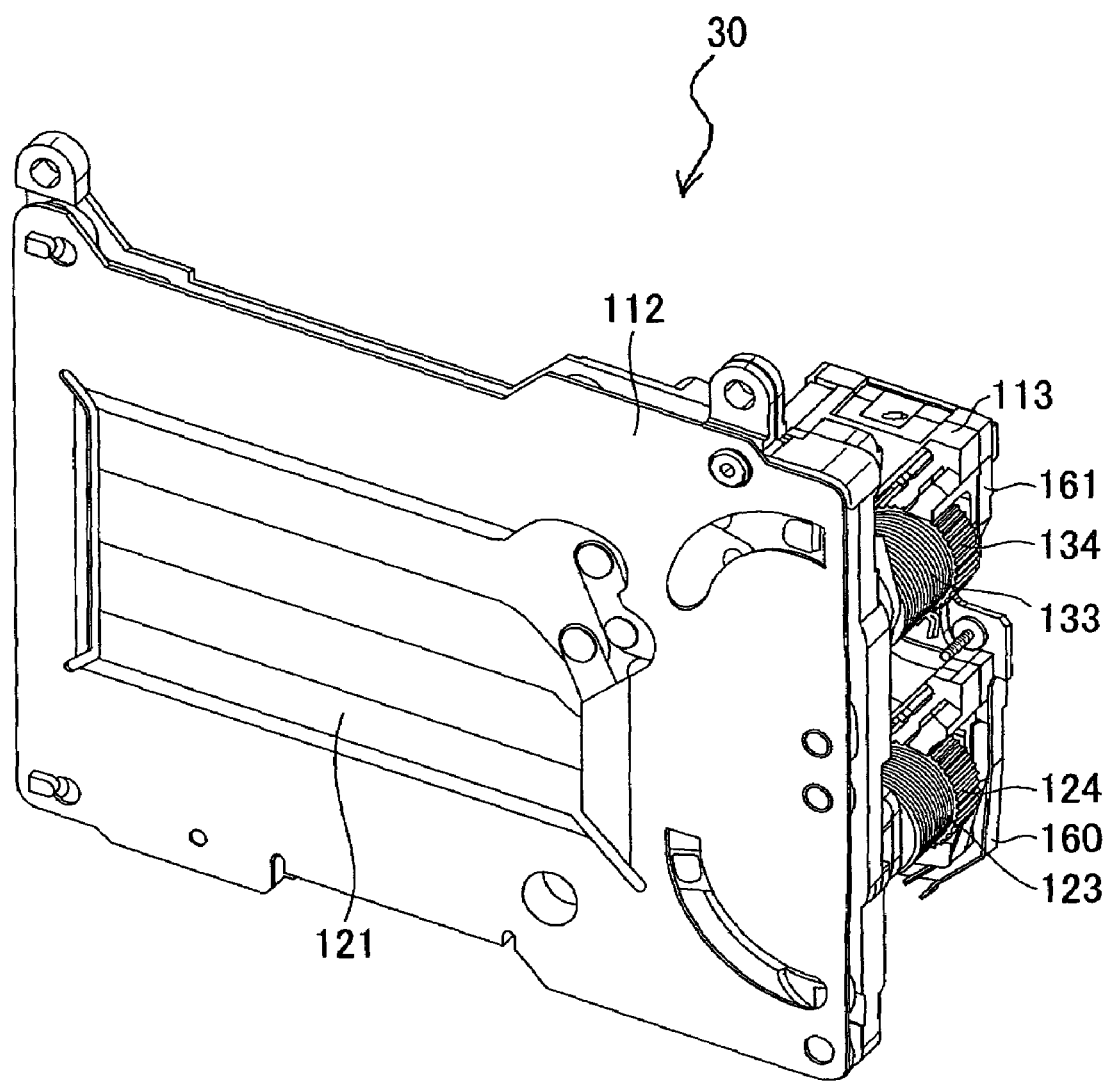
FIG. 13 illustrates the overall structure of the shutter device according to the second embodiment of the present invention.

The shutter device 30 according to a second embodiment of the present invention will now be described with reference to FIGS. 12 to 18. FIGS. 12 and 13 illustrate an overall structure of the shutter device 30. FIGS. 14 to 18 each illustrate one of states in the charging operation of the shutter device 30. The elements of the image-capturing apparatus 1 other than the shutter device 30 are the same as those shown in FIGS. 1 to 4 of the first embodiment, and therefore, detailed descriptions of those elements will be omitted below.

Figure 14:
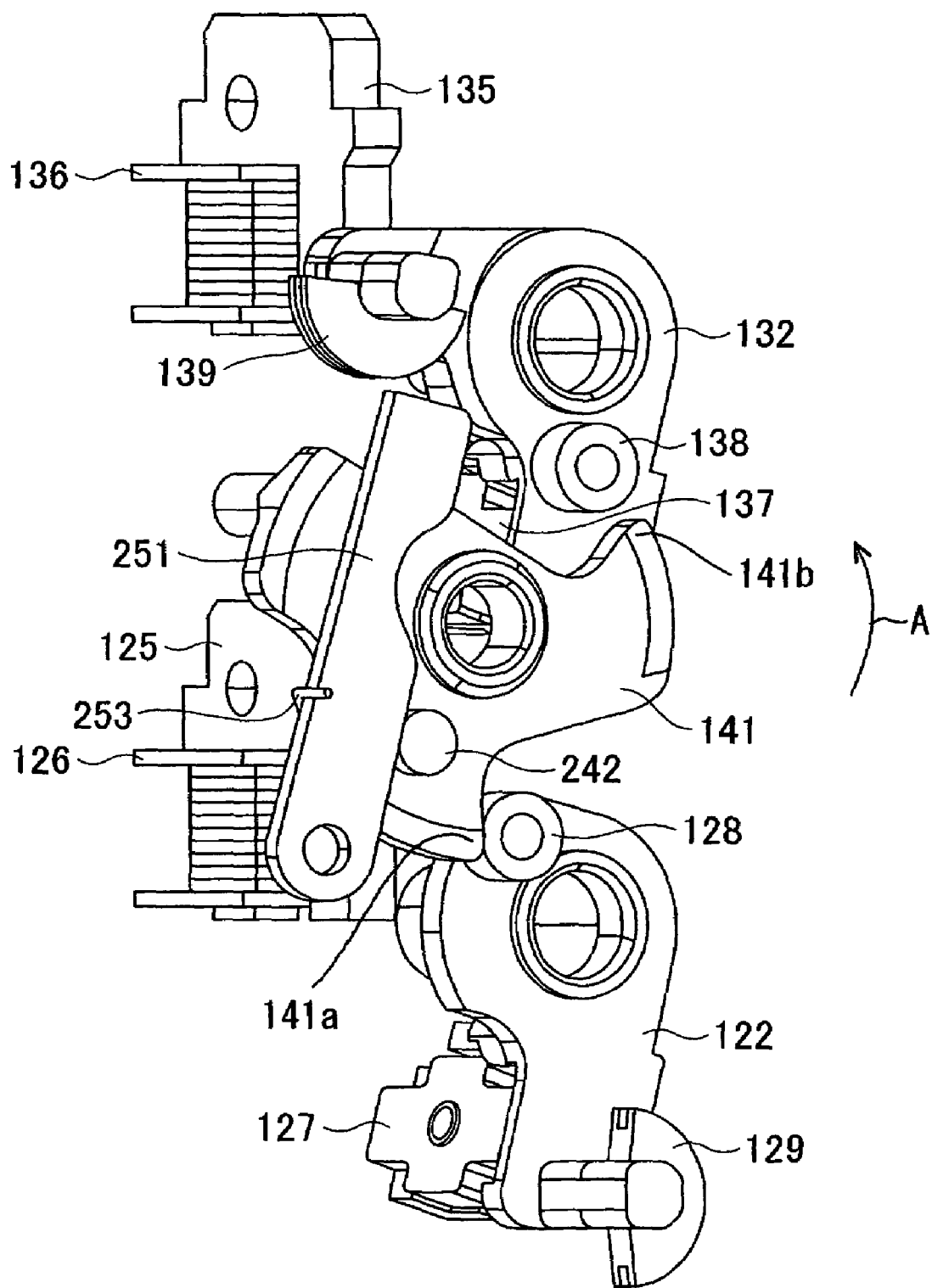
FIG. 14 illustrates a state in which a light-exposure process is completed according to the second embodiment of the present invention.

FIGS. 12, 13, and 14 illustrate the structure of the shutter device 30 according to the second embodiment of the present invention. Components shown in FIGS. 12 to 14 that are the same as those in FIGS. 5 to 7 of the first embodiment are given the same reference numerals, and therefore, detailed descriptions of those components will be omitted below.

The shutter device 30 shown in FIGS. 12 to 14 is different from that shown in FIGS. 5 to 7 in that the shutter device 30 in FIGS. 12 to 14 is not provided with the supporting lever 151, the supporting-driving lever 152, the supporting-lever spring 153, and the supporting-lever absorption spring 154 shown in FIGS. 5 to 7. Instead, the shutter device 30 in FIGS. 12 to 14 is provided with a supporting lever 251 and a supporting-lever spring 253. The supporting lever 251 is rotatably supported by the shutter base plate 110 and is capable of protruding towards and receding from the movement path of the second driving lever 132. Moreover, the supporting lever 251 is constantly biased by the supporting-lever spring 253 in the direction in which the supporting lever 251 protrudes into the movement path of the second driving lever 132.

Figure 15:
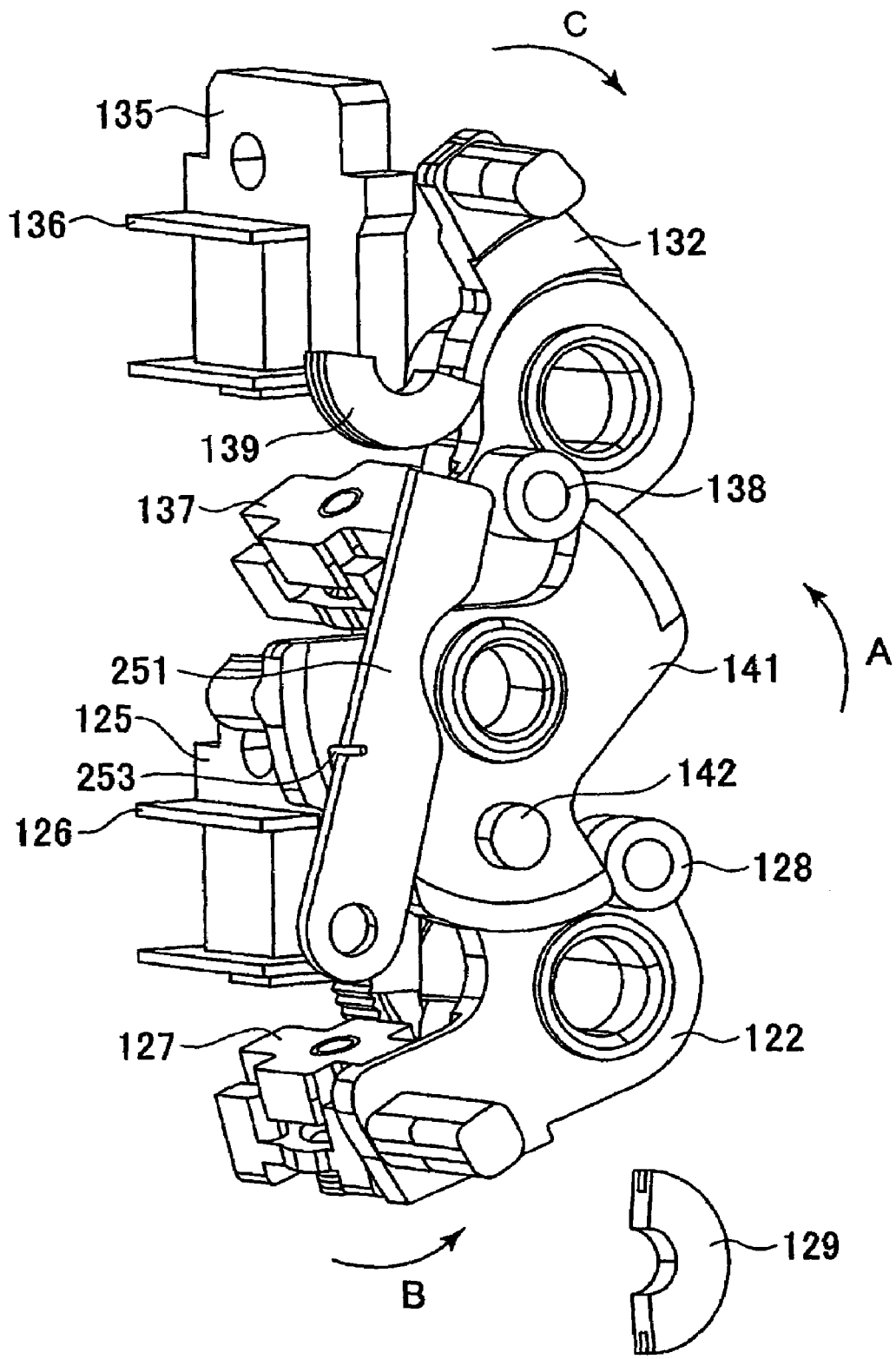
FIG. 15 illustrates a state in the process of a charging operation according to the second embodiment of the present invention.
Figure 16:
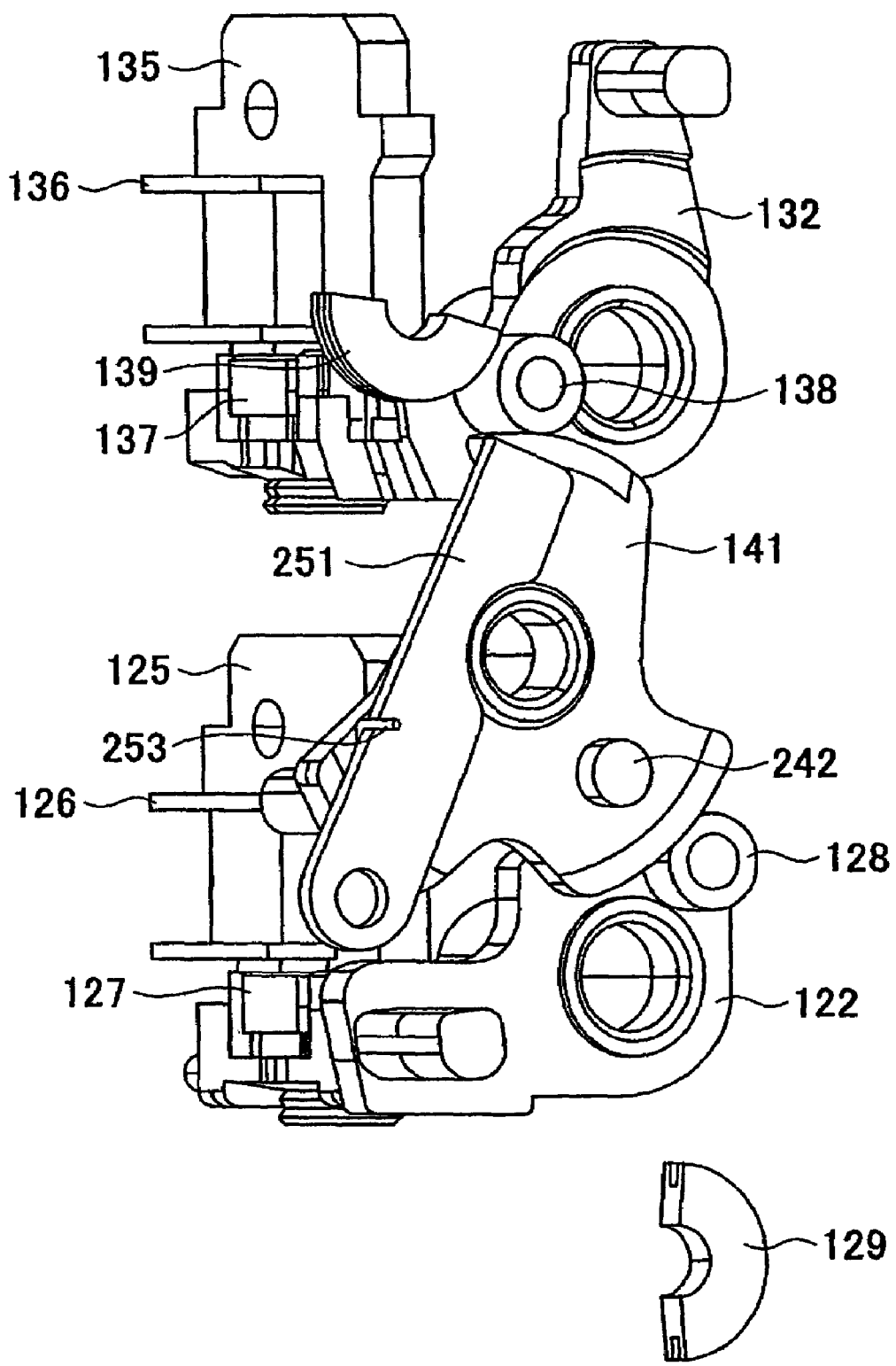
FIG. 16 illustrates a state in which the charging operation is completed according to the second embodiment of the present invention.

Referring to FIGS. 14 to 16, the shutter-charging operation will be described below. FIG. 14 illustrates a state in which the light exposure process is completed. FIG. 15 illustrates a state in the process of the charging operation. FIG. 16 illustrates a state in which the charging operation is completed.

In FIG. 14, when the charging lever 141 receives a charging force from an external unit, the charging lever 141 begins to rotate counterclockwise (i.e. in the direction of the arrow A) with respect to the rotational axis of the shutter base plate 110. As the charging lever 141 rotates, the first portion 141a of the charging lever 141 abuts on the charging roller 128 mounted to the first driving lever 122. This allows the first driving lever 122 to start rotating in the direction of the arrow B shown in FIG. 15, whereby the charging operation of the first curtain 121 begins. As the charging lever 141 rotates further in the counterclockwise direction, the charging lever 141 abuts on the charging roller 138 mounted to the second driving lever 132. Thus, the second driving lever 132 starts rotating in the direction of the arrow C shown in FIG. 15, whereby the charging operation of the second curtain 131 begins. In response to this further rotation of the charging lever 141, the supporting-driving-lever driving portion 142 recedes from the supporting lever 251. Consequently, the force preliminarily applied to the supporting lever 251 that allows the supporting lever 251 to recede from the movement path of the second driving lever 132 is cancelled out due to the supporting-lever spring 253. Thus, the supporting lever 251 protrudes into the movement path of the second driving lever 132 in response to a biasing force of the supporting-lever spring 253. As a result, the supporting lever 251 abuts on the charging roller 138, as shown in FIG. 15.

As the charging lever 141 rotates further in the counterclockwise direction (i.e. the direction of the arrow A) from the state shown in FIG. 15, the charging operations of the first driving lever 122 and the second driving lever 132 proceed. When the second driving lever 132 reaches an overcharged range, the supporting lever 251 stops blocking the charging roller 138. Thus, the supporting lever 251 protrudes into the movement path of the second driving lever 132 in response to the biasing force of the supporting-lever spring 253 so as to reach the state shown in FIG. 16. As a result, the charging operations for the first curtain 121 and the second curtain 131 are completed.

Figure 17:
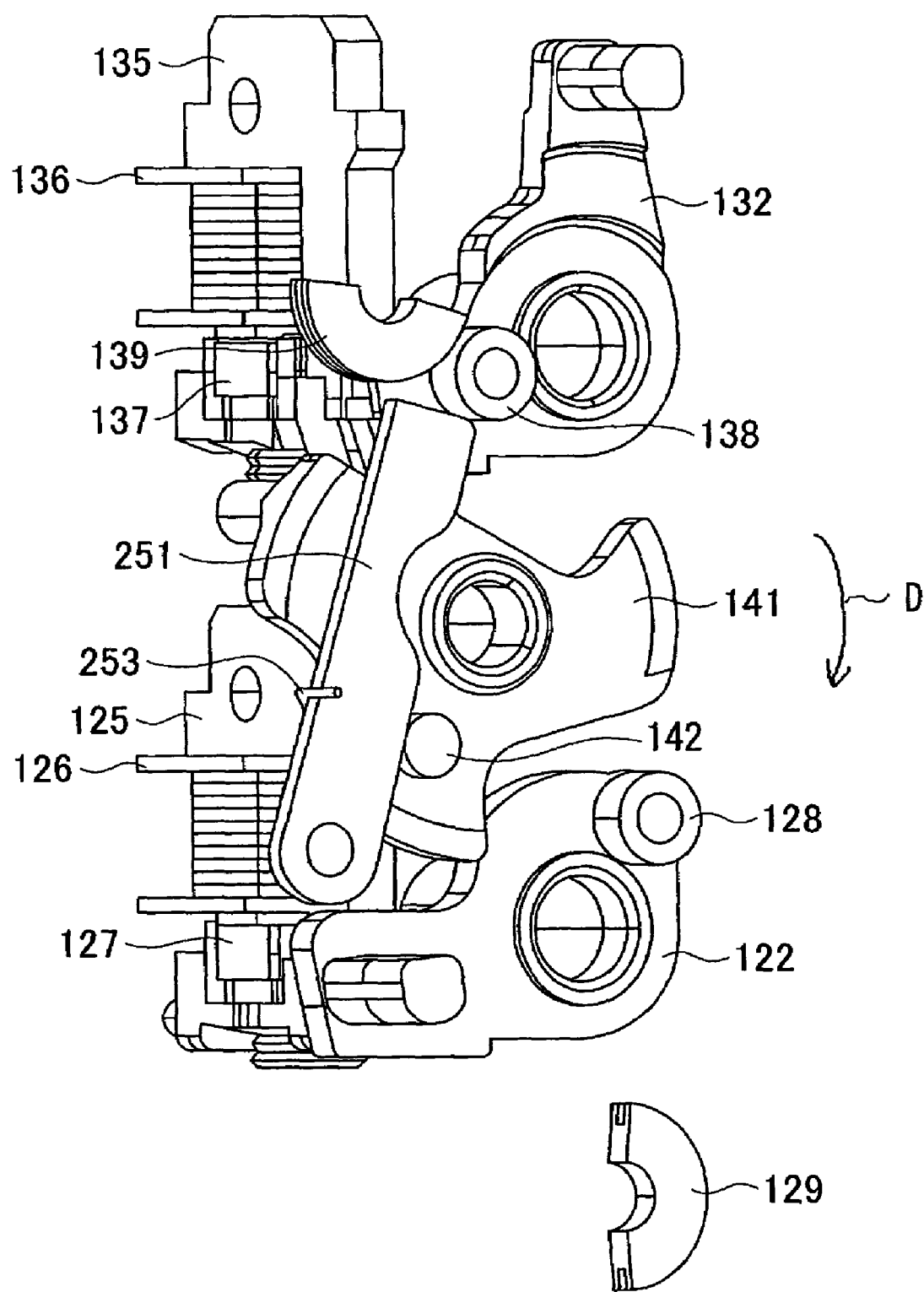
FIG. 17 illustrates a light-exposure preparation state according to the second embodiment of the present invention.

Referring to FIGS. 16 and 17, the process from the charged state to the image-capturing operation will be described below.

In the state shown in FIG. 16 in which the charging operations for the first curtain 121 and the second curtain 131 are completed, the coil 126 and the coil 136 are electrified in order to hold the first curtain 121 and the second curtain 131. Subsequently, a releasing operation of the charging force input to the charging lever 141 from the external unit is started. In this case, even if the charge-releasing operation of the charging lever 141 is started, the armature 127 and the armature 137 are still attached to the yoke 125 and the yoke 135, respectively, due to the electricity applied to the coil 126 and the coil 136. Accordingly, the first driving lever 122 and the second driving lever 132 are maintained in the state shown in FIG. 16. When the charging force of the charging lever 141 is released, the charging lever 141 rotates clockwise (in the direction of the arrow D in FIG. 17) so as to reach the light-exposure preparation state shown in FIG. 17 in which the supporting-driving-lever driving portion 142 drives the supporting lever 251. In this state shown in FIG. 17, since the second driving lever 132 is maintained in an overcharged state, the second driving lever 132 and the supporting lever 251 do not engage with each other. This means that the supporting lever 251 recedes from the movement path of the second driving lever 132. By changing the electrified state of the coil 126 and the coil 136 to a non-electrified state, the first curtain 121 and the second curtain 131 are driven, whereby the image-capturing process is performed.

Figure 18:
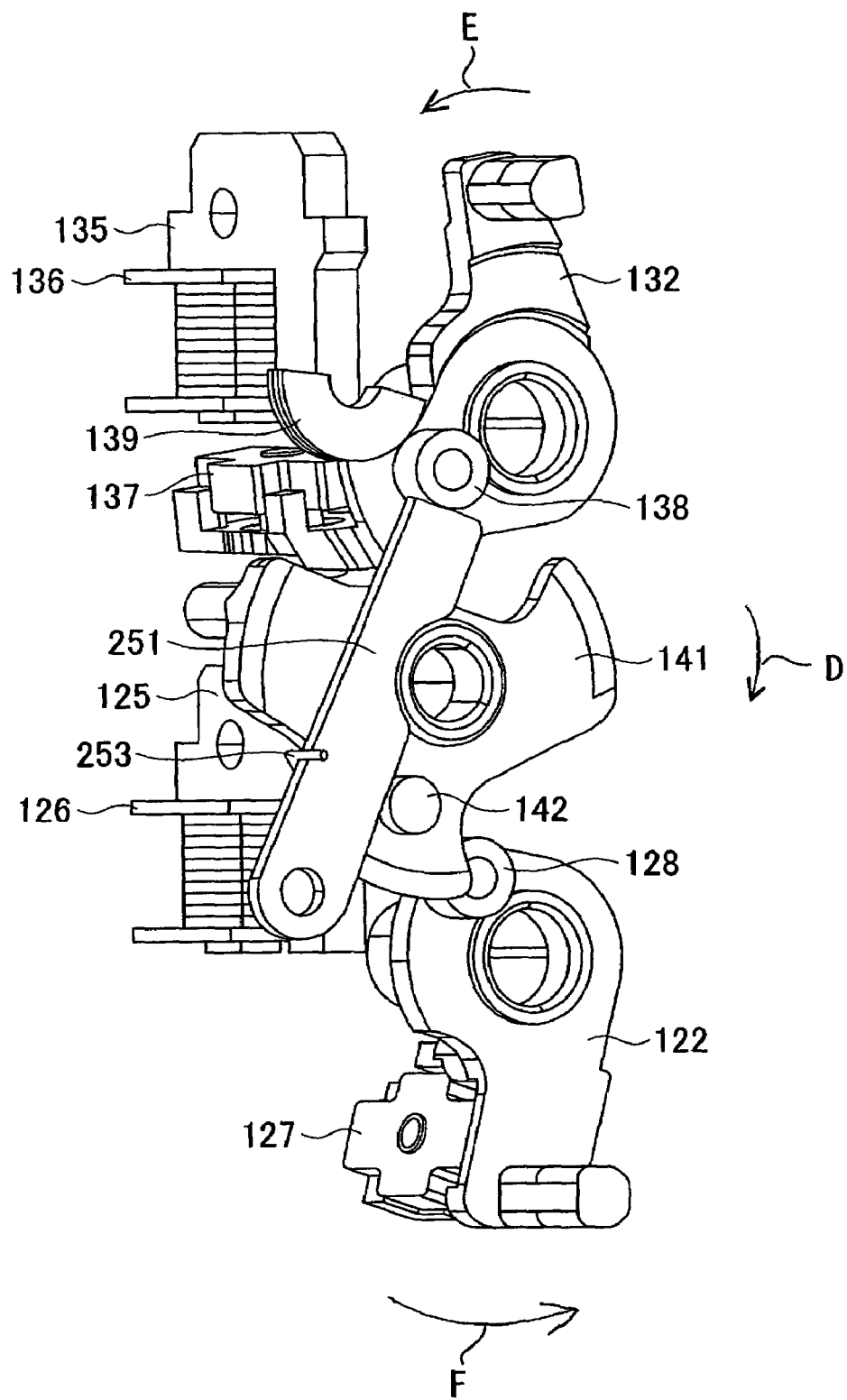
FIG. 18 illustrates a state in which the shutter device is open in the second embodiment of the present invention.

Referring to FIGS. 16 and 18, the process from the charged state to the opened-shutter state will be described below.

FIG. 16 illustrates the state of the shutter device 30 in which the charging operation is completed. In this state, the charge-releasing operation of the charging lever 141 is started. In this case, unlike the switching process to the image-capturing operation, the coil 126 and the coil 136 are not electrified. Accordingly, when the charging lever 141 starts rotating in the direction of the arrow D in order to start the charge-releasing operation, the second driving lever 132 starts to rotate in the direction of the arrow E and the first driving lever 122 starts to rotate in the direction of the arrow F. In this case, the second driving lever 132 abuts on the supporting lever 251 shortly after the start of the rotation so as to become held by the supporting lever 251 as shown in FIG. 18. The second driving lever 132 is thus prevented from rotating any further in the direction of the arrow E. On the other hand, the first driving lever 122 rotates until reaching its operational position. Furthermore, in this case, the charging lever 141 is in a position between the state shown in FIG. 16 in which the charging operation is completed and the light-exposure preparation state shown in FIG. 17, such that the supporting-driving-lever driving portion 142 is stopped just before abutting on the supporting lever 251. Accordingly, the supporting lever 251 remains engaged to the charging roller 138 mounted to the second driving lever 132, whereby an opened state of the shutter device 30 is maintained.

Although the above embodiments are directed to an image-capturing apparatus of a replaceable-lens type, the embodiments may alternatively be applied to optical apparatuses of other types, such as an image-capturing apparatus of a fixed-lens type.

In the second embodiment, when the second light-blocking unit is attached to and supported by the yoke 135, the following operation is performed. The charging lever 141 is movable between a first position shown in FIG. 16 to a second position shown in FIG. 17. When the charging lever 141 moves from the first position to the second position, the supporting lever 251 is forced to recede from the movement path of the second light-blocking unit. Consequently, this allows the second light-blocking unit to become movable when the attachment state of the second light-blocking unit is released. On the other hand, when the second light-blocking unit is not attached to the yoke 135, the following operation is performed. When the charging lever 141 moves from the first position shown in FIG. 16 to a third position shown in FIG. 18, the charging lever 141 becomes engaged to the supporting lever 251 so as to maintain the supporting lever 251 in a protruded state in the movement path of the second light-blocking unit. Consequently, even when the charged state of the second light-blocking unit is released, the second light-blocking unit is maintained in a state where the shutter aperture portion is open.

Accordingly, similar to the first embodiment, the second embodiment provides a shutter device 30 having a simplified structure without requiring a designated interlocking mechanism between the shutter device 30 and an external unit, and moreover, provides a shutter device 30 that can maintain the second light-blocking unit in a state where the shutter aperture portion is open without having to hold the second light-blocking unit electrically. Furthermore, by providing the image-capturing apparatus 1 with the shutter device 30 described above, the switching process between a light-exposure state in which the image-capturing unit 31 performs a light-exposure operation and an image-capturing state in which a continuous image from the image-capturing unit 31 is captured (for example, a state in which the captured image can be viewed through the monitor provided on the back surface of the image-capturing apparatus 1) can be performed with a simple structure. In this case, a designated interlocking mechanism between the shutter device 30 and an external unit is not necessary, and moreover, the second light-blocking unit is maintained in a state where the shutter aperture portion is open without having to hold the second light-blocking unit electrically.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2004-286778 filed Sep. 30, 2004, which is hereby incorporated by reference herein in its entirety.

What is claimed is:

1. A shutter device comprising:
    a first light-blocking unit that is movable between a charged position for closing a shutter aperture portion and a position for opening the shutter aperture portion;
    a second light-blocking unit that is movable between a charged position for opening the shutter aperture portion and a position for closing the shutter aperture portion;
    a charging member which charges the first and second light-blocking units and is movable at least between a first position in which the charging member maintains a charged state of the first light-blocking unit and a charged state of the second light-blocking unit and a second position in which the first and second light-blocking units are movable;
    electromagnetic circuits to which the first and second light-blocking units are attachable so as to electrically support the first light-blocking unit in the charged state and the second light-blocking unit in the charged state, the electromagnetic circuits sequentially releasing the attached first and second light-blocking units so as to sequentially allow the first and second light-blocking units to move; and
    a supporting member which protrudes into or recedes from a movement path of the second light-blocking unit in response to a movement of the charging member, the supporting member protruding into the movement path of the second light-blocking unit so as to maintain the second light-blocking unit in a state in which the shutter aperture portion is open.

2. The shutter device according to claim 1, wherein when the second light-blocking unit is attached to and supported by the corresponding electromagnetic circuit, the supporting member disposed in the movement path of the second light-blocking unit recedes from the movement path as the charging member moves from the first position to the second position, the supporting member allowing the second light-blocking unit to move when the second light-blocking unit is released from the electromagnetic circuit, and
    wherein when the second light-blocking unit is not attached to the corresponding electromagnetic circuit, the supporting member is maintained in a protruded state in the movement path of the second light-blocking unit even when the charging member moves from the first position to the second position, the second light-blocking unit being maintained in the state where the shutter aperture portion is open even when the charged state of the second light-blocking unit is released.

3. The shutter device according to claim 1, wherein the charging member is movable to a third position disposed between the first position and the second position,
wherein when the second light-blocking unit is attached to and supported by the corresponding electromagnetic circuit, the charging member is movable from the first position to the second position, the supporting member disposed in the movement path of the second light-blocking unit recedes from the movement path as the charging member moves from the first position to the second position, the supporting member allowing the second light-blocking unit to move when the second light-blocking unit is released from the electromagnetic circuit, and
wherein when the second light-blocking unit is not attached to the corresponding electromagnetic circuit, the charging member engages to the supporting member as the charging member moves from the first position to the third position so as to allow the supporting member to be maintained in a protruded state in the movement path of the second light-blocking unit, the second light-blocking unit being maintained in the state where the shutter aperture portion is open even when the charged state of the second light-blocking unit is released.

4. The shutter device according to claim 1, wherein the supporting member is biased in a direction in which the supporting member protrudes towards the movement path of the second light-blocking unit, wherein when the charging member moves from the first position to the second position in a state where the second light-blocking unit is attached to and supported by the corresponding electromagnetic circuit, the moving charging member allows the supporting member to recede from the movement path.

5. An image-capturing apparatus comprising:
a first light-blocking unit that is movable between a charged position for closing a shutter aperture portion and a position for opening the shutter aperture portion;
a second light-blocking unit that is movable between a charged position for opening the shutter aperture portion and a position for closing the shutter aperture portion;
a charging member which charges the first and second light-blocking units and is movable at least between a first position in which the charging member maintains a charged state of the first light-blocking unit and a charged state of the second light-blocking unit and a second position in which the first and second light-blocking units are movable;
electromagnetic circuits to which the first and second light-blocking units are attachable so as to electrically support the first light-blocking unit in the charged state and the second light-blocking unit in the charged state, the electromagnetic circuits sequentially releasing the attached first and second light-blocking units so as to sequentially allow the first and second light-blocking units to become movable; and a supporting member which protrudes into or recedes from a movement path of the second light-blocking unit in response to a movement of the charging member, the supporting member protruding into the movement path of the second light-blocking unit so as to maintain the second light-blocking unit in a state where the shutter aperture portion is open.

6. The image-capturing apparatus according to claim 5, wherein when the second light-blocking unit is attached to and supported by the corresponding electromagnetic circuit, the supporting member disposed in the movement path of the second light-blocking unit recedes from the movement path as the charging member moves from the first position to the second position, the supporting member allowing the second light-blocking unit to move when the second light-blocking unit is released from the electromagnetic circuit, and
wherein when the second light-blocking unit is not attached to the corresponding electromagnetic circuit, the supporting member is maintained in a protruded state in the movement path of the second light-blocking unit even when the charging member moves from the first position to the second position, the second light-blocking unit being maintained in the state where the shutter aperture portion is open even when the charged state of the second light-blocking unit is released.

7. The image-capturing apparatus according to claim 5, wherein the charging member is movable to a third position disposed between the first position and the second position,
wherein when the second light-blocking unit is attached to and supported by the corresponding electromagnetic circuit, the charging member is movable from the first position to the second position, the supporting member disposed in the movement path of the second light-blocking unit receding from the movement path as the charging member moves from the first position to the second position, the supporting member allowing the second light-blocking unit to move when the second light-blocking unit is released from the electromagnetic circuit, and
wherein when the second light-blocking unit is not attached to the corresponding electromagnetic circuit, the charging member becomes engaged to the supporting member as the charging member moves from the first position to the third position so as to allow the supporting member to be maintained in a protruded state in the movement path of the second light-blocking unit, the second light-blocking unit being maintained in the state where the shutter aperture portion is open even when the charged state of the second light-blocking unit is released.

8. The image-capturing apparatus according to claim 5, further comprising an image display portion configured to display a continuous image of a subject received from an image-capturing circuit, the image being captured by the image-capturing circuit via the shutter aperture portion, the shutter aperture portion being maintained in an opened state by the second light-blocking unit.

* * * * *